(12) United States Patent
Kobayashi

(10) Patent No.: US 9,988,979 B2
(45) Date of Patent: Jun. 5, 2018

(54) POWER GENERATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Masashi Kobayashi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/456,876

(22) Filed: Mar. 13, 2017

(65) Prior Publication Data

US 2017/0268415 A1    Sep. 21, 2017

(30) Foreign Application Priority Data

Mar. 16, 2016 (JP) ................ 2016-051954

(51) Int. Cl.
*F02B 63/04* (2006.01)
*F01D 5/04* (2006.01)
*F02B 37/10* (2006.01)
*F02B 39/10* (2006.01)
*F01D 15/10* (2006.01)
*F02D 29/06* (2006.01)
*F02D 41/00* (2006.01)
(Continued)

(52) U.S. Cl.
CPC ............. *F02B 63/04* (2013.01); *F01D 5/04* (2013.01); *F01D 15/10* (2013.01); *F02B 37/10* (2013.01); *F02B 39/10* (2013.01); *F02D 29/06* (2013.01); *F02D 41/0007* (2013.01); *F02D 41/1406* (2013.01); *B60W 20/00* (2013.01); *F02B 37/12* (2013.01); *F02D 2250/24* (2013.01); *F05D 2220/40* (2013.01); *Y02T 10/144* (2013.01)

(58) Field of Classification Search
CPC .......... F02B 63/04; F02B 37/10; F02B 39/10; F01D 5/04; F01D 15/10; F02D 29/06; F02D 41/0007; F02D 41/1406; Y02T 10/44

See application file for complete search history.

(56) References Cited

U.S. PATENT DOCUMENTS

2016/0251011 A1* 9/2016 Hata ................ F02B 37/12 701/22
2016/0265422 A1* 9/2016 Yamashita ............... F01N 5/04

FOREIGN PATENT DOCUMENTS

EP    3037640 A4 *   2/2017   ............. F02B 37/16
JP    2005083317 A       3/2005
(Continued)

*Primary Examiner* — Hieu T Vo
(74) *Attorney, Agent, or Firm* — Sughrue Mion, PLLC

(57) ABSTRACT

A power generation system for an internal combustion engine includes: a turbocharger capable of performing a turbocharger power generation using rotation of a turbine provided in an exhaust passage of the internal combustion engine; and a control unit including at least one electronic control unit. The control unit is configured to calculate a first power generation instruction value required for the turbocharger, and determine whether or not a magnitude relationship in which generated power of the turbocharger power generation is larger than an increase amount of a pumping loss of the internal combustion engine resulting from the turbocharger power generation is satisfied based on an operational state of the internal combustion engine, and calculate the first power generation instruction value larger when the magnitude relationship is satisfied than when the magnitude relationship is not satisfied.

8 Claims, 7 Drawing Sheets

(51) Int. Cl.
*F02D 41/14* (2006.01)
*B60W 20/00* (2016.01)
*F02B 37/12* (2006.01)

(56) References Cited

FOREIGN PATENT DOCUMENTS

| | | |
|---|---|---|
| JP | 2007-327401 A | 12/2007 |
| WO | 2007/141613 A1 | 12/2007 |

* cited by examiner

POWER GENERATION SYSTEM FOR INTERNAL COMBUSTION ENGINE

INCORPORATION BY REFERENCE

The disclosure of Japanese Patent Application No. 2016-051954 filed on Mar. 16, 2016 including the specification, drawings and abstract is incorporated herein by reference in its entirety.

BACKGROUND

1. Technical Field

The present disclosure relates to a power generation system for an internal combustion engine.

2. Description of Related Art

As a power generation system, there is known a power generation system that calculates power generation efficiency of a turbocharger with a power generation function and the power generation efficiency of an alternator and that calculates respective amount of power generation instruction of the turbocharger and the alternator such that one having higher one of such power generation efficiencies preferentially undertakes on power generation work (Japanese Patent Application Publication No. 2007-327401 (JP 2007-327401 A).

In the power generation resulting from the turbocharger, the exhaust energy of an internal combustion engine is converted into electric power by driving the turbine with exhaust gas. However, even a pumping loss of the internal combustion engine being increased with power generation resulting from the turbocharger is not taken into consideration in the power generation system of JP 2007-327401 A. For that reason, the power generation system of JP 2007-327401 A cannot necessarily select power generation that is always efficient, and has the room for improvements.

SUMMARY

The present disclosure provides a power generation system for an internal combustion engine that can select efficient power generation in consideration of a pumping loss of the internal combustion engine between power generation performed by a turbocharger with a power generation function and power generation performed by an alternator.

A power generation system for an internal combustion engine according to an aspect of the present disclosure includes: a turbocharger capable of generating power by performing a turbocharger power generation using rotation of a turbine provided in an exhaust passage of the internal combustion engine; and a control unit including at least one electronic control unit. The control unit is configured to: calculate a first power generation instruction value, the first power generation instruction value being a value of generated power required for the turbocharger; control the turbocharger to perform the turbocharger power generation based on the first power generation instruction value; determine whether or not a magnitude relationship in which generated power of the turbocharger power generation is larger than an increase amount of a pumping loss of the internal combustion engine resulting from the turbocharger power generation is satisfied based on an operational state of the internal combustion engine; and calculate the first power generation instruction value larger when the magnitude relationship is satisfied than when the magnitude relationship is not satisfied.

The power generation system according to the above aspect may include an alternator capable of generating power, using output of the internal combustion engine. In the above aspect, the control unit may be configured to: calculate required generated power required to the internal combustion engine; calculate the first power generation instruction value and a second power generation instruction value required for the alternator such that the required generated power is generated through the turbocharger power generation and alternator power generation performed by the alternator; calculate the first power generation instruction value and the second power generation instruction value such that a ratio of the first power generation instruction value to the second power generation instruction value when the magnitude relationship is satisfied become larger than when the magnitude relationship is not satisfied; and control the turbocharger to perform the turbocharger power generation based on the first power generation instruction value and control the alternator to perform the alternator power generation based on the second power generation instruction value.

In the above aspect, the control unit may be configured to calculate the first power generation instruction value and the second power generation instruction value such that a ratio of the first power generation instruction value to a first power generation upper limit value at which power is capable of being generated through the turbocharger power generation, is larger when the magnitude relationship is satisfied than when the magnitude relationship is not satisfied, and a ratio of the second power generation instruction value to a second power generation upper limit value at which power is capable of being generated through the alternator power generation is smaller when the magnitude relationship is satisfied than when the magnitude relationship is not satisfied.

In a case where the operational state of the internal combustion engine is the operational state where the magnitude relationship in which the generated power of the turbocharger power generation is larger than the loss increase amount of the pumping loss of the internal combustion engine resulting from the turbocharger power generation is satisfied, an advantage in the energy balance is obtained by performing the turbocharger power generation. On the contrary, if the turbocharger power generation is performed in the case of the operational state where the magnitude relationship is not satisfied, there is instead a loss in the energy balance and there is no advantage. Therefore, it is more desirable to limit the turbocharger power generation. According to the power generation system according to the above aspect, in a case where such a magnitude relationship is satisfied, compared to a case where the magnitude relationship is not satisfied, the ratio of the first power generation instruction value to the first power generation upper limit value resulting from the turbocharger power generation becomes larger, and the ratio of the second power generation instruction value to the second power generation upper limit value resulting from alternator power generation becomes smaller. In other words, in a case where the above magnitude relationship is satisfied, compared to a case where the magnitude relationship is not satisfied, the load factor of the turbocharger power generation becomes higher, and the load factor of the alternator power generation becomes lower. In this way, an increase in the pumping loss resulting from the turbocharger power generation is taken into consideration, and the respective generated powers of the turbocharger power generation and the alternator power generation are distributed to the required generated power required for the internal combustion engine. Hence, efficient power generation suitable for the operational state of the internal combustion engine can be selected.

In the above aspect, the control unit may be configured to calculate the first power generation upper limit value as the first power generation instruction value and a value obtained by subtracting the first power generation upper limit value from the required generated power as the second power generation instruction value, when the magnitude relationship is satisfied.

According to the above aspect, when the above magnitude relationship is satisfied, the ratio of the first power generation instruction value to the first power generation upper limit value of the turbocharger power generation is maximized, and the insufficient amount of the required generated power that is insufficient only through the turbocharger power generation is compensated for through the alternator power generation.

In the above aspect, the control unit may be configured to calculate the second power generation upper limit value as the second power generation instruction value and a value obtained by subtracting the second power generation upper limit value from the required generated power as the first power generation instruction value, when the magnitude relationship is not satisfied.

According to the above aspect, in a case where the above magnitude relationship is not satisfied, the ratio of the second power generation instruction value to the second power generation upper limit value of the alternator is maximized, and the insufficient amount of the required generated power that is insufficient only through the alternator power generation is compensated for through the turbocharger power generation.

In the above aspect, the control unit may be configured to calculate the first power generation upper limit value of the turbocharger power generation as the first power generation instruction value and the second power generation upper limit value of the alternator power generation as the second power generation instruction value, irrespective of the magnitude relationship, when a total of the first power generation upper limit value and the second power generation upper limit value is smaller than the required generated power.

According to the above aspect, the shortage of the generated power to the required generated power can be reduced as much as possible.

In the above aspect, the control unit may be configured to determine whether or not the magnitude relationship is satisfied based on whether or not the first power generation upper limit value is larger than the increase amount of the pumping loss.

In the above aspect, the control unit may be configured to determine the magnitude relationship, using the first power generation upper limit value and the increase amount of the pumping loss that are respectively determined corresponding to the output of the internal combustion engine when the magnitude relationship is determined.

As described above, according to the power generation system according to the aspect of the present disclosure, an increase in the pumping loss resulting from the turbocharger power generation is taken into consideration, and the respective generated powers of the turbocharger power generation and the alternator power generation are distributed to the required generated power required for the internal combustion engine. Hence, efficient power generation suitable for the operational state of the internal combustion engine can be selected.

BRIEF DESCRIPTION OF THE DRAWINGS

Features, advantages, and technical and industrial significance of exemplary embodiments of the disclosure will be described below with reference to the accompanying drawings, in which like numerals denote like elements, wherein.

DETAILED DESCRIPTION OF EMBODIMENTS

Figure 1:
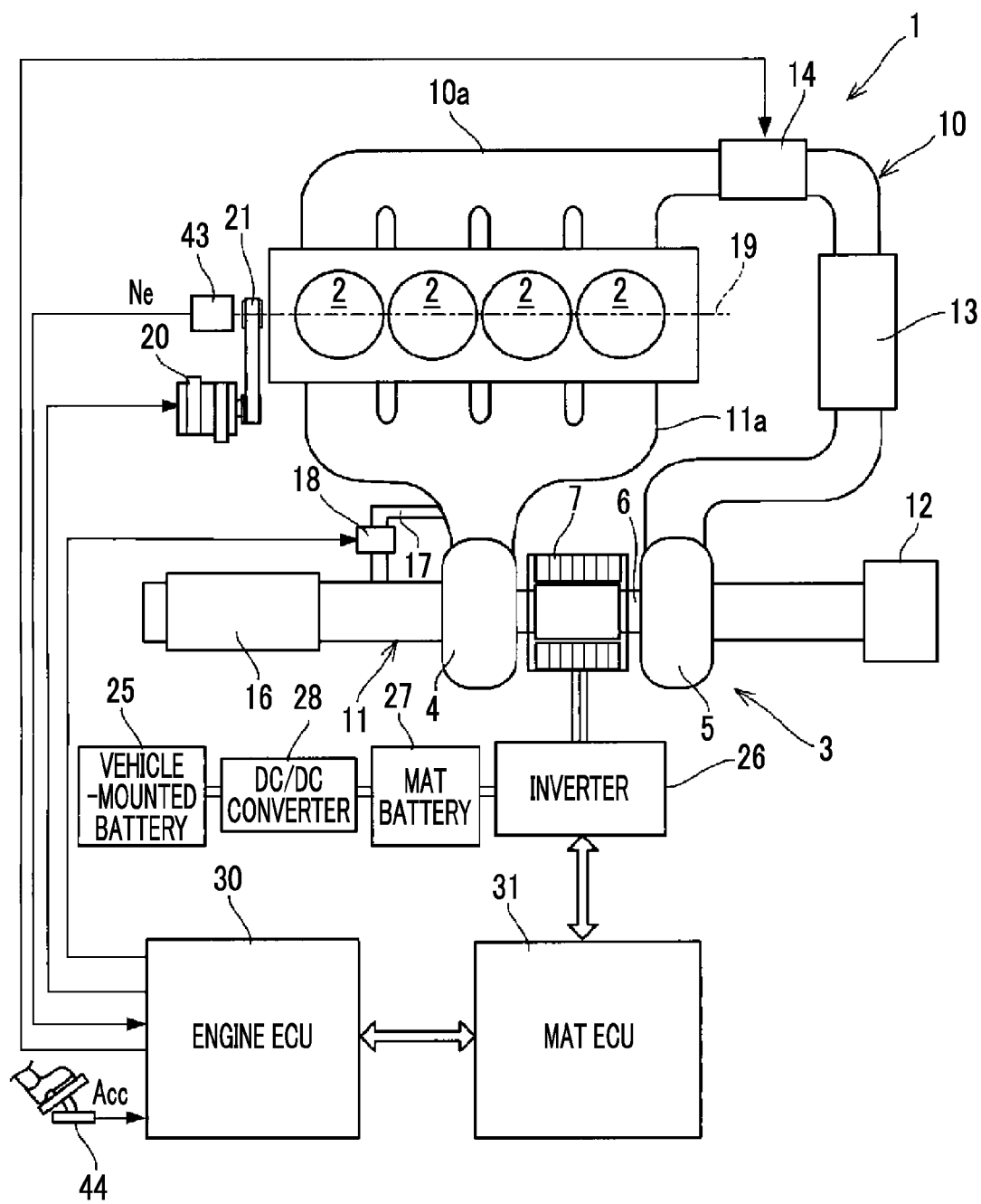
FIG. 1 is a view illustrating an overall configuration of an internal combustion engine to which a power generation system related to one embodiment of the disclosure is applied.

As illustrated in FIG. 1, an internal combustion engine 1 is constituted as an in-line 4-cylinder type spark-ignition internal combustion engine in which four cylinders 2 are lined up, and is mounted on a vehicle (not illustrated). The internal combustion engine 1 is provided with a motor-assisted turbocharger (MAT) 3 with a power generation function. The MAT 3 has a turbine 4 and a compressor 5, and a rotating shaft 6 that couples the turbine 4 and the compressor 5 is provided with a three-phase AC type motor generator 7 that functions as an electric motor and a generator. The MAT 3 can make the motor generator 7 function as an electric motor to assist in supercharging, or can make the motor generator 7 function as a generator to convert exhaust energy into power.

An intake passage 10 and an exhaust passage 11 are connected to the respective cylinders 2 of the internal combustion engine 1. The intake passage 10 is provided with an air cleaner 12 that filters intake air, the compressor 5 of the MAT 3, an intercooler 13 that cools the air compressed by the compressor 5, and a throttle valve 14 that adjusts the amount of intake air. The intake passage 10 includes an intake manifold 10a that branches to the respective cylinders 2 downstream from the throttle valve 14.

The exhaust passage 11 Includes an intake manifold 11a that collect exhaust gas of the respective cylinders 2, the turbine 4 of the MAT 3 is provided in a collection portion downstream from the intake manifold 11a, and an exhaust gas purifying catalyst 16 is provided downstream from the turbine 4. Additionally, the exhaust passage 11 is provided with a bypass passage 17 that connects the upstream and the downstream of the turbine 4 of the MAT 3 together and bypasses the turbine 4. The bypass passage 17 is opened and closed by a waist gate valve 18. The supercharging pressure of the internal combustion engine 1 is adjusted by the waist gate valve 18.

The internal combustion engine 1 is provided with an alternator 20 capable of generating power using the output thereof. The output of a crankshaft 19 is transmitted to the alternator 20 via a belt transmission mechanism 21. The alternator 20 is electrically connected to a vehicle-mounted battery 25 with a rated voltage of 12 V. The motor generator 7 of the MAT 3 is AC-connected to a MAT inverter 26, and the MAT inverter 26 is connected to a MAT battery 27 with a rated of 42 V. The vehicle-mounted battery 25 and the MAT battery 27 are connected together via a DC/DC converter 28.

The control of the internal combustion engine 1 is performed by an engine electronic control unit (engine ECU) 30 constituted as a computer. The engine ECU 30 also performs the basic operation control of the internal combustion engine 1, such as controlling the opening degree of the throttle valve 14 and controlling the amount fuel injected in an interlocking manner the control of the opening degree thereof, and performs the control of accessories of the internal combustion engine 1, such as controlling the generated power of the alternator 20. In addition, the engine ECU 30 performs the supercharging control of operates the MAT 3 and the waist gate valve 18, respectively, to adjust the supercharging pressure of the internal combustion engine 1. Above all, the control of the MAT 3 is directly performed by a MAT electronic control unit (MATECU) 31 connected to be capable of communicating with the engine ECU 30. That is, the engine ECU 30 instructs the MATECU 31 about various kinds of information, thereby directly controlling the MAT 3.

The supercharging auxiliary control of making the motor generator 7 of the MAT 3 function as an electric motor, and the power generation control of making the motor generator 7 function as a generator are included in the control of the MAT 3. The supercharging auxiliary control makes the motor generator 7 function as an electric motor in order to solve a turbo lag, for example, at the time of the acceleration transition of the vehicle, thereby assisting in supercharging. Additionally, the power generation control makes the motor generator 7 function as a generator in a state where the waist gate valve 18 is closed, thereby converting the exhaust energy received by the turbine 4 into generated power.

Figure 2:
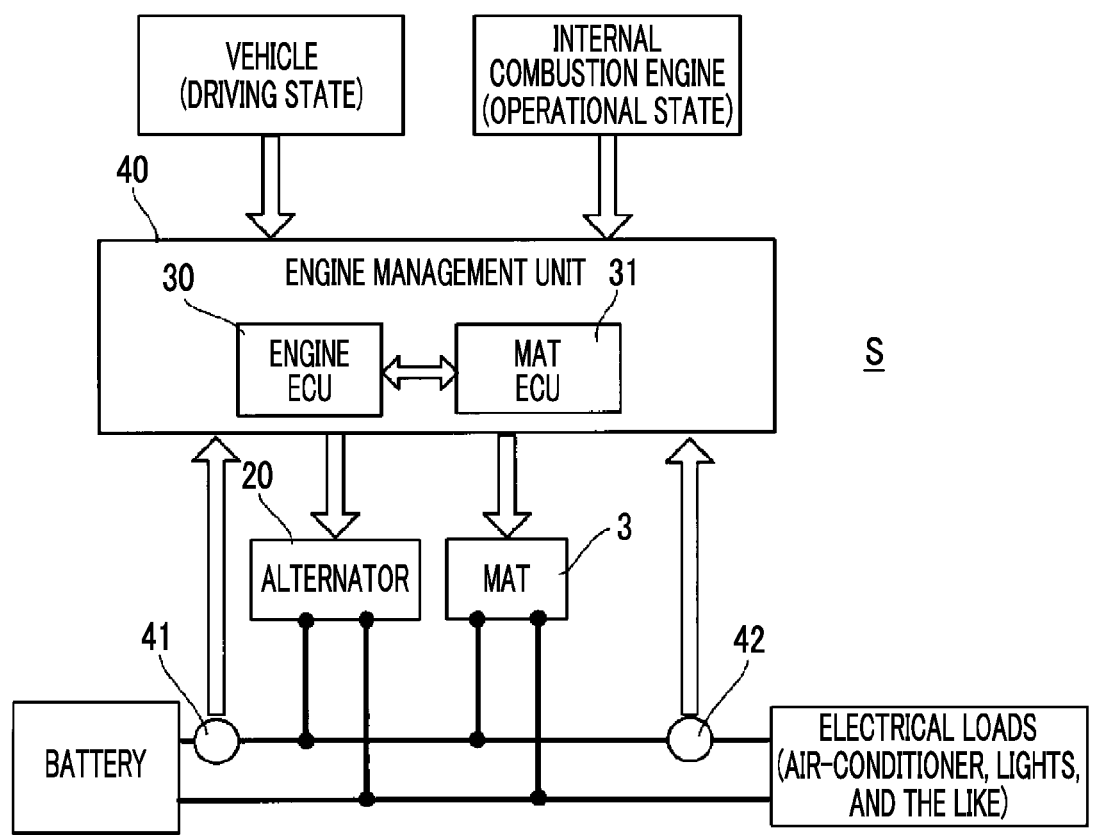
FIG. 2 is a view illustrating the outline of the power generation system.

The power generation (hereinafter, referred to as turbocharger power generation) performed by the MAT 3 and the power generation (hereinafter referred to as alternator power generation) performed by the alternator 20 are performed by a power generation system S of the present embodiment having a configuration illustrated in FIG. 2. The power generation system S includes an energy management unit 40 constituted with the engine ECU 30 and the MATECU 31, the MAT 3 and the alternator 20 that are controlled by the energy management unit 40, an SOC sensor 41 that detects the charge state of the vehicle-mounted battery 25 or the MAT battery 27, and a power sensor 42 for finding out the electrical load of a vehicle-mounted air-conditioner or lights.

For example, various kinds of information, such as charge states of the respective batteries 25, 26 and the like that are output as output signals of the SOC sensor 41, a power state of vehicle-mounted equipment reflected in an output signal of the power sensor 42, a driving state of the vehicle, and an operational state of the internal combustion engine 1, are input to the energy management unit 40. The energy management unit 40 calculates required generated power required for the internal combustion engine 1 on the basis of the various kinds of input information, and calculates respective generated powers of the turbocharger power generation and the alternator power generation on the basis of the required generated power. Then, the energy management unit 40 controls the MAT 3 and the alternator 20 such that the turbocharger power generation and the alternator power generation are respectively performed with the calculated respective generated powers.

Figure 3:
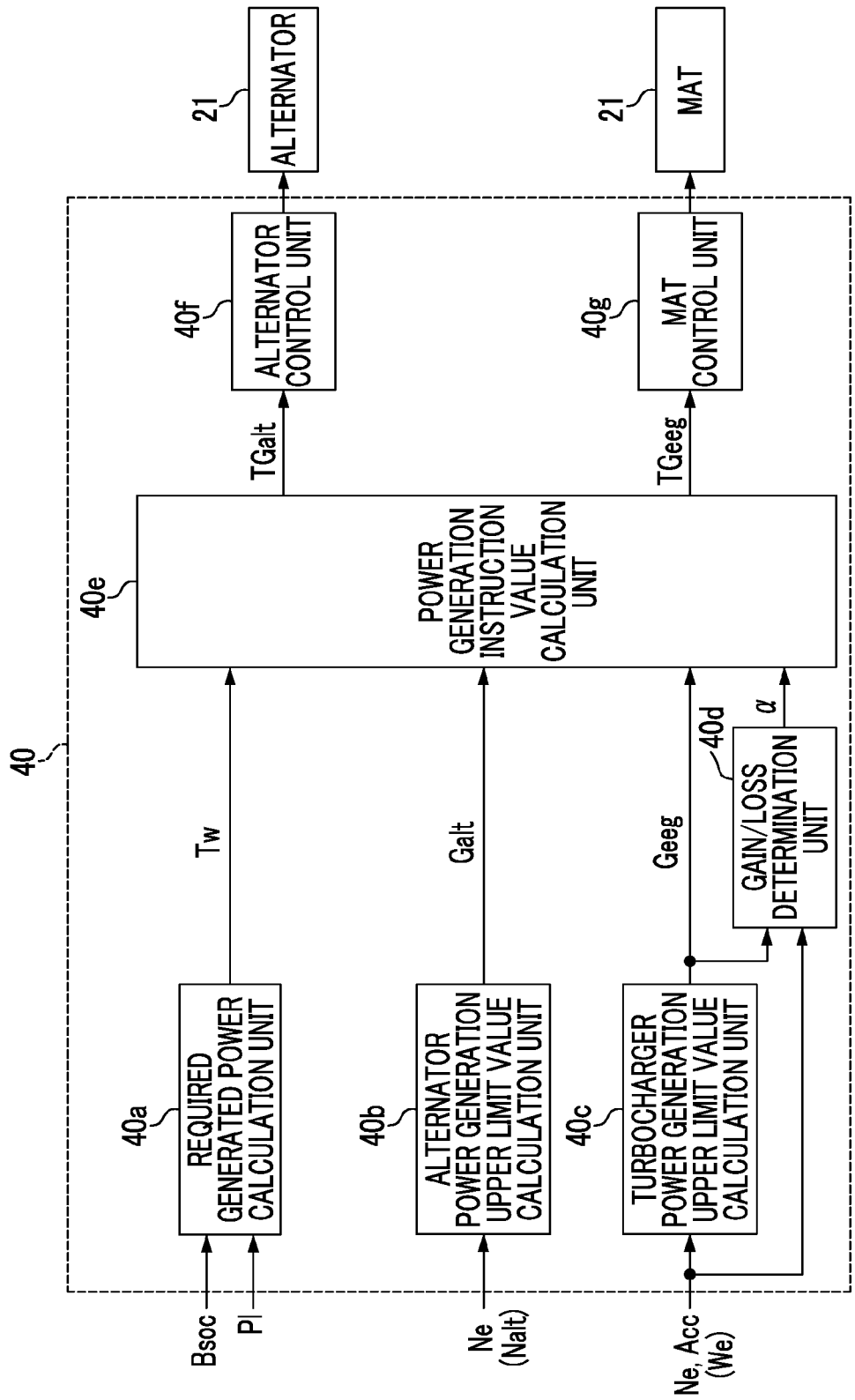
FIG. 3 is a block diagram illustrating the details of an energy management unit illustrated in FIG. 2.

The details of the energy management unit 40 are as illustrated in FIG. 3. When the engine ECU 30 and the MATECU 31 execute a predetermined program, respective constituent units of the illustrated energy management unit 40 are logically configured inside these ECUs.

A required generated power calculation unit 40a acquires a charge state Bsoc and an electrical load Pl of the vehicle-mounted battery 25 and the like with reference to the respective output signals of the SOC sensor 41 and the power sensor 42. The required generated power calculation unit 40a calculate a required generated power Tw required for the internal combustion engine 1 on the basis of the acquired charge state Bsoc and the acquired electrical load Pl, and sends the calculated required generated power Tw to a power generation instruction value calculation unit 40e. The calculation of the required generated power Tw may be performed, for example, by retrieving a calculation map that is stored in advance, or may be performed on the basis of a calculation formula with the charge state Bsoc and the electrical load Pl as variables.

An alternator power generation upper limit value calculation unit 40b acquires an engine speed Ne with reference to an output signal of a crank angle sensor 43 (refer to FIG. 1), and calculates a rotational speed Nalt of the alternator 20 obtained by multiplying the engine speed Ne by a change gear ratio of the belt transmission mechanism 21. Then, the calculation unit 40b calculates an upper limit value Galt at which power is capable of being generated through the alternator power generation on the basis of the rotational speed Nalt of the alternator 20, and sends the calculated upper limit value to the power generation instruction value calculation unit 40e. Since a relationship between the rotational speed Nalt and the generated power of the alternator 20 is determined, the alternator power generation upper limit value calculation unit 40b calculates the upper limit value Galt, for example, on the basis of a predetermined calculation formula that is prepared in advance.

A turbocharger power generation upper limit value calculation unit 40c acquires the engine speed Ne with reference to the output signal of the crank angle sensor 43 (refer to FIG. 1), and acquires an accelerator opening degree Acc with reference to an output signal of the accelerator opening degree sensor 44 (refer to FIG. 1). Then, the calculation unit 40c calculates engine output We as an operational state on the basis of the engine speed Ne and the accelerator opening degree Acc, calculates a power generation upper limit value Geeg on the basis of the engine output We, and sends the calculated power generation upper limit value to the gain/loss determination unit 40d and the power generation instruction value calculation unit 40e, respectively.

Figure 4:
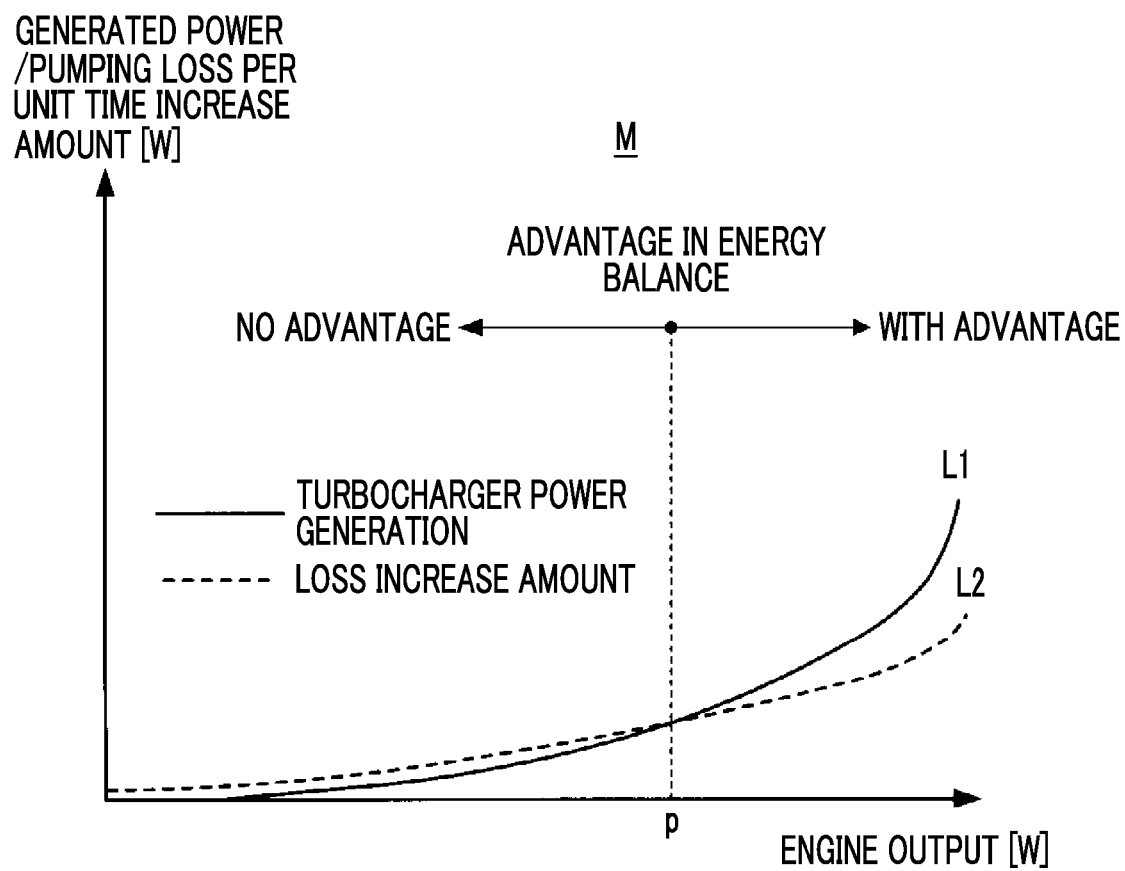
FIG. 4 is a view illustrating a determination map M for determining an advantage in energy balance.

The gain/loss determination unit 40d outputs a gain/loss determination value a showing the presence/absence of an advantage in the energy balance when the power generation upper limit value Geeg is compared with an increase amount of a pumping loss (hereinafter, also referred to as loss increase amount) of the internal combustion engine 1 resulting from the turbocharger power generation, and send the output gain/loss determination value to the power generation instruction value calculation unit 40e. The gain/loss determination value α is set "1" that means the presence of an advantage in the energy balance in a case where a magnitude relationship in which the power generation upper limit value Geeg is larger than the loss increase amount is satisfied, and is set to "0" that means the absence of an advantage in the energy balance in a case where the magnitude relationship is not satisfied. The gain/loss determination unit 40*d* sets the value of the gain/loss determination value α, for example, on the basis of the determination map M illustrated in FIG. 4. The determination map M has a structure in which engine power is set on a horizontal axis, the generated power is set on a vertical axis, the generated power per unit time resulting from the turbocharger power generation is illustrated by a curve line L1 that is a solid line, and the increase amount of the pumping loss per unit time is illustrated by a curve line L2 that is a dashed line. As is clear from the determination map M, the two curve lines L1, L2 intersect each other at a branch point p of the engine power. Since the above magnitude relationship in which the generated power resulting from the turbocharger power generation is larger than the loss increase amount is satisfied on a side higher than the branch point p, there is an advantage in the energy balance. For that reason, in a case where the engine output We is larger than the branch point p, the gain/loss determination unit 40*d* sets the value of the gain/loss determination value α to 1. On the other hand, on a side lower than the branch point p, the generated power resulting from the turbocharger power generation is smaller than the loss increase amount. Thus, the above magnitude relationship is not satisfied, and there is no advantage in the energy balance. For that reason, in a case where the engine output We is equal to or smaller than the branch point p, the gain/loss determination unit 40d sets the value of the gain/loss determination value α to 0.

The power generation instruction value calculation unit 40*e* calculates a power generation instruction value TGeeg to be required for the alternator 20 and a power generation instruction value TGalt to be required for the MAT 3, respectively, according to a processing routine illustrated in FIG. 5 to be described below using various kinds of information sent from the above-described respective units 40*a* to 40*d*. The power generation instruction value TGalt is sent to an alternator control unit 40*f*, and the power generation instruction value TGeeg is sent to the MAT control unit 40*g*. The alternator control unit 40*f* instructs the alternator 20 about the power generation instruction value TGalt, and makes the alternator perform the alternator power generation. The MAT control unit 40*g* instructs the MAT 3 about the power generation instruction value TGeeg, and make the MAT perform the turbocharger power generation.

Figure 5:
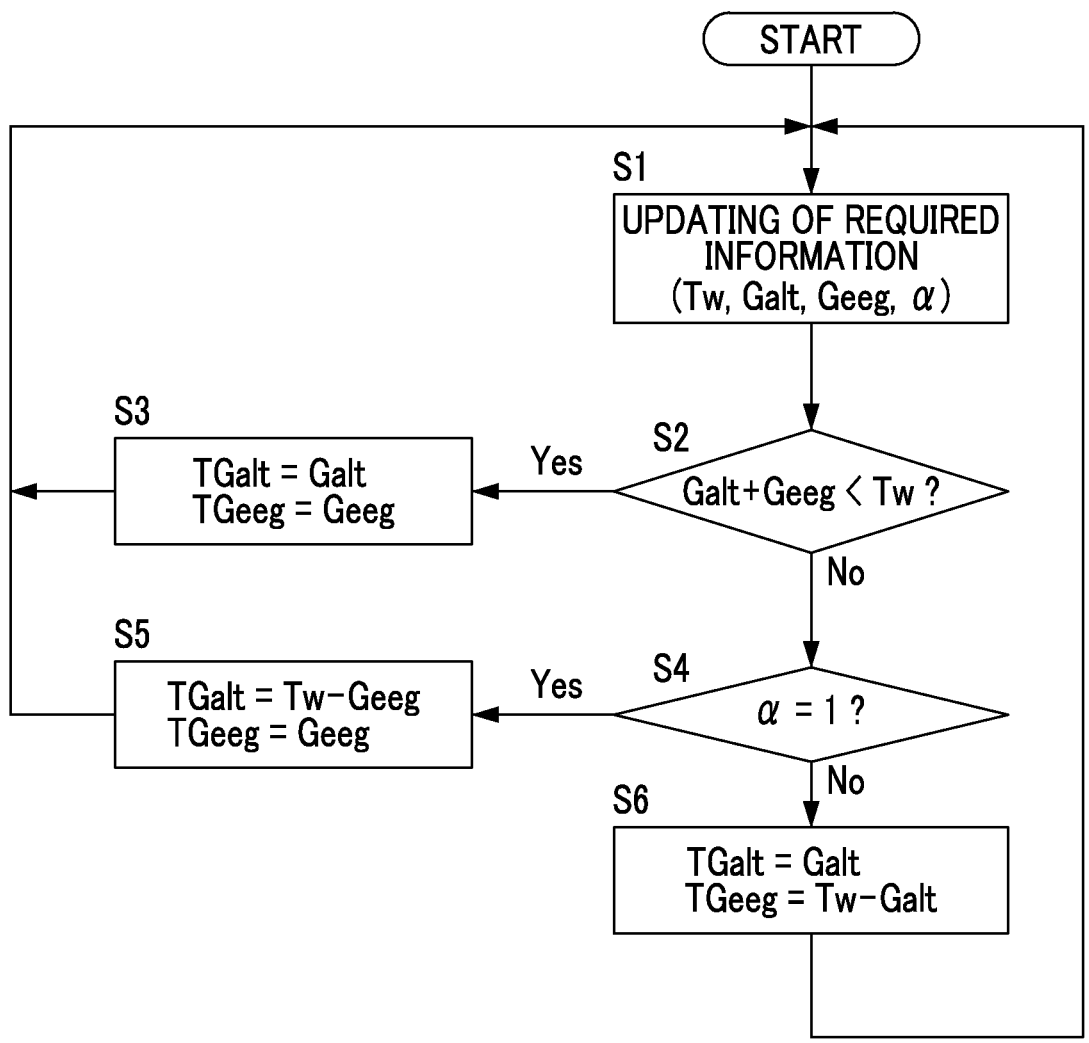
FIG. 5 is a flowchart illustrating an example of a control routine elated to the embodiment of the disclosure.

As illustrated in FIG. 5, in Step S1, the power generation instruction value calculation unit 40*e* reads required information including the required generated power Tw, the power generation upper limit value Galt, the power generation upper limit value Geeg, and the gain/loss determination value α, and updates these values.

In Step S2, the power generation instruction value calculation unit 40*e* determines whether or not a total of the power generation upper limit value Galt and the power generation upper limit value Geeg is smaller than the required generated power Tw, in other words, whether or not the required generated power Tw can be provided through the alternator power generation and the turbocharger power generation. In a case where the total of the power generation upper limit value Galt and the power generation upper limit value Geeg is smaller than the required generated power Tw, the required generated power Tw cannot be provided through the alternator power generation and the turbocharger power generation.

Then, in Step S3, the power generation instruction value calculation unit 40*e* substitutes the power generation upper limit value Galt in the power generation instruction value TGalt, and substitutes the power generation upper limit value Geeg in the power generation instruction value TGeeg. That is, the power generation instruction value calculation unit 40*e* calculates the power generation upper limit value Galt as the power generation instruction value TGalt and calculates the power generation upper limit value Geeg as the power generation instruction value TGeeg. Accordingly, the respective power generation capacities of the alternator 20 and the MAT 3 that are determined in the current operational state of the internal combustion engine 1 is exhibited to the maximum. Hence, the shortage of the generated power to the required generated power Tw can be reduced as much as possible.

On the other hand, in a case where the total of the power generation upper limit value Galt and the power generation upper limit value Geeg is equal to or larger than the required generated power Tw, the required generated power Tw can be provided through the alternator power generation and the turbocharger power generation. Then, in Step S4, the power generation instruction value calculation unit 40e determines whether or not the gain/loss determination value α is "1", that is, whether or not there is any advantage in the energy balance due to the performance of the turbocharger power generation. In a case where there is an advantage in the energy balance, the processing proceeds to Step S5, and in a case where there is no advantage in the energy balance, the processing proceeds to Step S6.

Figure 6:
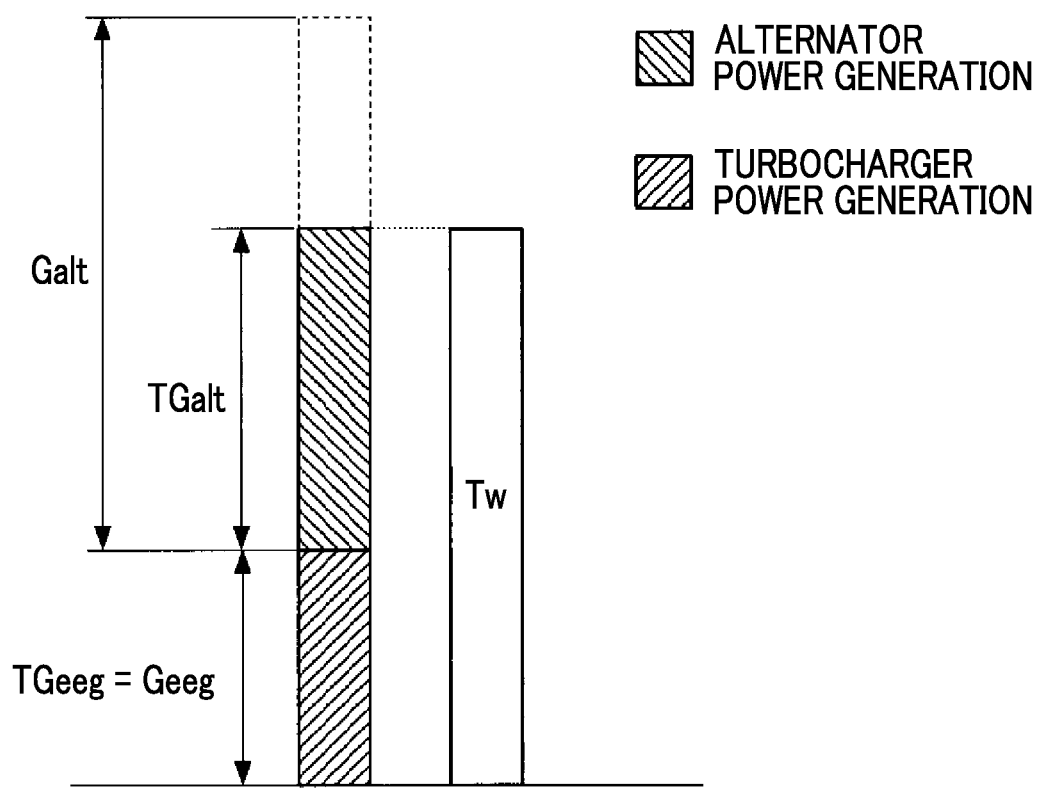
FIG. 6 is a view illustrating a method of calculating a power generation instruction value in a case where there is an advantage in the energy balance according to performance of turbocharger power generation.

In Step S5, the power generation instruction value calculation unit 40*e* substitutes a value, which is obtained by subtracting the power generation upper limit value Geeg from the required generated power Tw, in the power generation instruction value TGalt, and substitutes the power generation upper limit value Geeg in the power generation instruction value TGeeg, thereby calculating the power generation instruction value TGalt and the power generation instruction value TGeeg, respectively. After that, the processing is returned to Step S1. As illustrated in FIG. 6, a load factor of the turbocharger power generation is maximize by executing the processing of Step S5. That is, a ratio of the power generation instruction value TGeeg to the power generation upper limit value Geeg of the turbocharger power generation is maximized (100%). Then, the insufficient amount of the required generated power Tw that is insufficient only through the turbocharger power generation is compensated for through the alternator power generation.

For example, in a case where the required generated power Tw, the power generation upper limit value Galt of the alternator power generation, the power generation upper limit value Geeg of the turbocharger power generation, and the gain/loss determination value α are the followings, the power generation instruction value TGalt and the power generation instruction value TGeeg are calculated as follows.

$Tw=1000[W]$ $Galt=1440[W]$ (Alternator rotational speed: 4000 [rpm])

$Geeg=400[W]$ (Engine power: 30 [KW])

α=1 (With advantage in energy balance)

$TGalt=1000-400=600\ [W]$ $TGeeg=400\ [W]$

Figure 7:
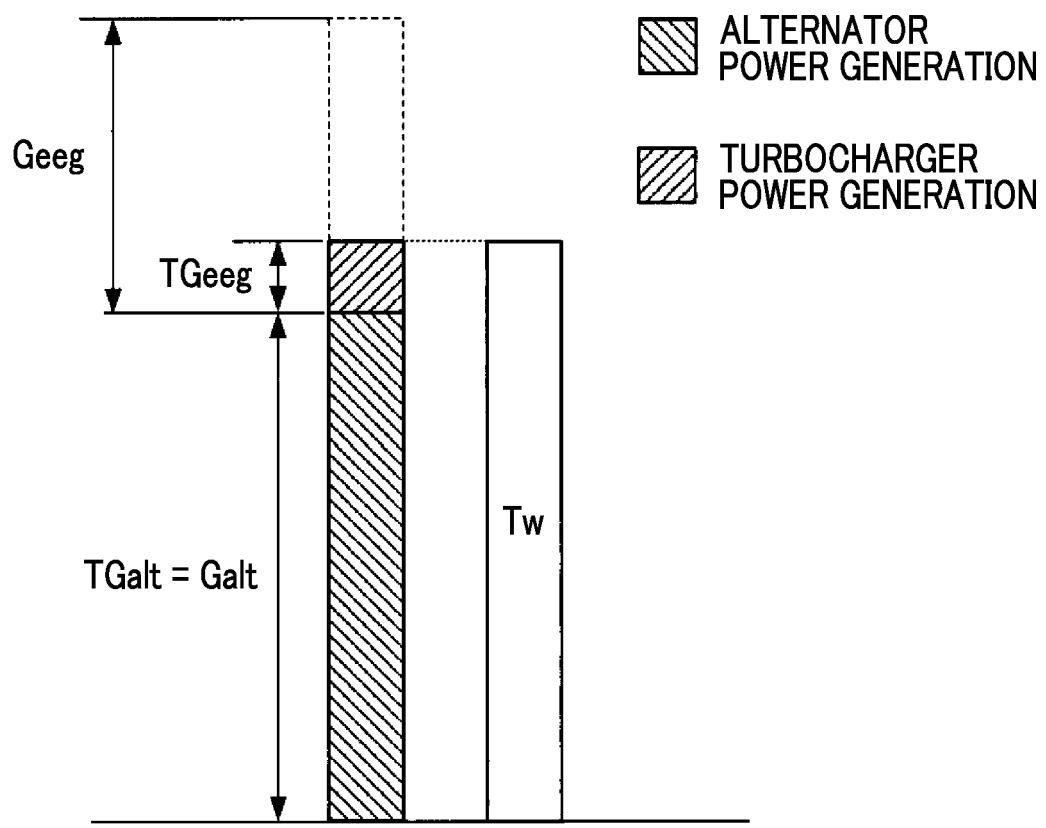
FIG. 7 is a view illustrating a method of calculating the power generation instruction value in a case where there is no advantage in the energy balance according to the performance of the turbocharger power generation.

In Step S6, in contrast to Step S5, the power generation instruction value calculation unit 40*e* substitutes the power generation upper limit value Galt in the power generation instruction value TGalt, and substituting a value, which is obtained by subtracting the power generation upper limit value Galt from the required generated power Tw, in the power generation instruction value TGeeg, thereby calculating the power generation instruction value TGalt and the power generation instruction value TGeeg, respectively. After that, the processing is returned to Step S1. As illustrated in FIG. 7, a load factor of the alternator power generation is maximize by executing the processing of Step S6. That is, a ratio of the power generation instruction value TGalt to the power generation upper limit value Galt of the alternator power generation is maximized (100%). Then, the insufficient amount of the required generated power Tw that is insufficient only through the alternator power generation is compensated for through the turbocharger power generation.

As can be understood from the comparison between FIG. 6 and FIG. 7, in the case of FIG. 6 where there is an advantage in the energy balance due to the performance of turbocharger power generation, compared to the case of FIG. 7 where there is no advantage, the load factor of the turbocharger power generation becomes larger and the load factor of the alternator power generation becomes smaller. In other words, in a case where the above-described magnitude relationship in which the generated power of the turbocharger power generation is larger than the loss increase amount of the pumping loss of the internal combustion engine 1 is satisfied, compared to the case where the magnitude relationship is not satisfied, the ratio of the power generation instruction value TGeeg to the power generation upper limit value Geeg of the turbocharger power generation becomes larger, and the ratio of the power generation instruction value TGalt to the power generation upper limit value Galt of the alternator power generation becomes smaller.

According to the present embodiment, an increase in the pumping loss resulting from the turbocharger power generation is taken into consideration as described above, and the power generation instruction value TGalt of the alternator power generation and the power generation instruction value TGeeg of the turbocharger power generation are calculated, respectively, so that the respective generated powers of the turbocharger power generation and the alternator power generation are distributed to the required generated power required for the internal combustion engine 1. Hence, efficient power generation suitable for the operational state of the internal combustion engine 1 can be selected.

The disclosure is not limited to the above embodiment, and can be embodied in various forms within the scope of the concept of the disclosure. In the above embodiment, the load factor of the turbocharger power generation is set to 100% in a case where the magnitude relationship in which the generated power resulting from the performance of the turbocharger power generation is larger than the loss increase amount of the pumping loss of the internal combustion engine 1 is satisfied and there is an advantage in the energy balance. However, as long as the load factor becomes larger compared to the case where the magnitude relationship is not satisfied, for example, the disclosure can also be embodied, for example, in a form in which the load factor is smaller than 100%, such as setting the load factor of the turbocharger power generation to 80% in a case where the magnitude relationship is satisfied. Additionally, the disclosure may be configured such that the power generation amount of the turbocharger power generation in a case where the magnitude relationship is satisfied becomes larger compared to a case where the magnitude relationship is not satisfied. Additionally, as for the load factor of the alternator power generation in a case where there is no advantage in the energy balance, the disclosure can also be embodied in a form in which the load factor is smaller than 100%, such as setting the load factor of the alternator power generation to 80%.

What is claimed is:

1. A power generation system for an internal combustion engine, comprising:
   a turbocharger capable of generating power by performing a turbocharger power generation using rotation of a turbine provided in an exhaust passage of the internal combustion engine; and
   a control unit including at least one electronic control unit, wherein the control unit is configured to
   calculate a first power generation instruction value, the first power generation instruction value being a value of generated power required for the turbocharger,
   control the turbocharger to perform the turbocharger power generation based on the first power generation instruction value,
   determine whether or not a magnitude relationship in which generated power of the turbocharger power generation is larger than an increase amount of a pumping loss of the internal combustion engine resulting from the turbocharger power generation is satisfied based on an operational state of the internal combustion engine, and
   calculate the first power generation instruction value larger when the magnitude relationship is satisfied than when the magnitude relationship is not satisfied.

2. The power generation system according to claim 1, further comprising:
   an alternator capable of generating power, using output of the internal combustion engine, and
   wherein the control unit is configured to
   calculate required generated power required to the internal combustion engine,
   calculate the first power generation instruction value and a second power generation instruction value required for the alternator such that the required generated power is generated through the turbocharger power generation and alternator power generation performed by the alternator,
   calculate the first power generation instruction value and the second power generation instruction value such that a ratio of the first power generation instruction value to the second power generation instruction value when the magnitude relationship is satisfied become larger than when the magnitude relationship is not satisfied, and
   control the turbocharger to perform the turbocharger power generation based on the first power generation instruction value and control the alternator to perform the alternator power generation based on the second power generation instruction value.

3. The power generation system according to claim 2, wherein
   the control unit is configured to calculate the first power generation instruction value and the second power generation instruction value such that a ratio of the first power generation instruction value to a first power generation upper limit value at which power is capable of being generated through the turbocharger power generation, is larger when the magnitude relationship is satisfied than when the magnitude relationship is not satisfied, and a ratio of the second power generation instruction value to a second power generation upper limit value at which power is capable of being generated through the alternator power generation is smaller when the magnitude relationship is satisfied than when the magnitude relationship is not satisfied.

4. The power generation system according to claim 3, wherein
the control unit is configured to calculate the first power generation upper limit value as the first power generation instruction value and a value obtained by subtracting the first power generation upper limit value from the required generated power as the second power generation instruction value, when the magnitude relationship is satisfied.

5. The power generation system according to claim 3, wherein
the control unit is configured to calculate the second power generation upper limit value as the second power generation instruction value and a value obtained by subtracting the second power generation upper limit value from the required generated power as the first power generation instruction value, when the magnitude relationship is not satisfied.

6. The power generation system according to claim 3, wherein
the control unit is configured to calculate the first power generation upper limit value of the turbocharger power generation as the first power generation instruction value and the second power generation upper limit value of the alternator power generation as the second power generation instruction value, irrespective of the magnitude relationship, when a total of the first power generation upper limit value and the second power generation upper limit value is smaller than the required generated power.

7. The power generation system according to claim 3, wherein
the control unit is configured to determine whether or not the magnitude relationship is satisfied based on whether or not the first power generation upper limit value is larger than the increase amount of the pumping loss.

8. The power generation system according to claim 3, wherein
the control unit is configured to determine the magnitude relationship, using the first power generation upper limit value and the increase amount of the pumping loss that are respectively determined corresponding to the output of the internal combustion engine when the magnitude relationship is determined.

* * * * *